United States Patent
Maroto Gil et al.

(10) Patent No.: US 11,522,923 B2
(45) Date of Patent: Dec. 6, 2022

(54) METHOD FOR ENABLING A CALLING USER EQUIPMENT, UE, TO RETRY A SESSION INITIATION PROTOCOL, SIP, CALL ATTEMPT TO A CALLED UE, OVER A CIRCUIT SWITCHED DOMAIN

(71) Applicant: Telefonaktiebolaget LM Ericsson (PUBL), Stockholm (SE)

(72) Inventors: Beatriz Maroto Gil, Majadahonda Madrid (ES); Juan De Dios Del Moral Moya, Madrid (ES); Margarita Gayo Arnaldo, Madrid (ES); Ignacio Saez Matallana, Madrid (ES); Emiliano Merino Vazquez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/277,357

(22) PCT Filed: Nov. 13, 2018

(86) PCT No.: PCT/EP2018/081074
§ 371 (c)(1),
(2) Date: Mar. 18, 2021

(87) PCT Pub. No.: WO2020/057764
PCT Pub. Date: Mar. 26, 2020

(65) Prior Publication Data
US 2022/0038509 A1     Feb. 3, 2022

(30) Foreign Application Priority Data
Sep. 20, 2018 (EP) .................................. 18382677

(51) Int. Cl.
| | |
|---|---|
| H04L 65/1073 | (2022.01) |
| H04L 65/1069 | (2022.01) |
| H04L 65/1045 | (2022.01) |
| H04L 65/1104 | (2022.01) |
| H04L 65/1016 | (2022.01) |
| H04W 76/16 | (2018.01) |

(52) U.S. Cl.
CPC ...... *H04L 65/1073* (2013.01); *H04L 65/1045* (2022.05); *H04L 65/1069* (2013.01);
(Continued)

(58) Field of Classification Search
CPC ............. H04L 65/1073; H04L 65/1069; H04L 65/1016; H04L 65/1006; H04L 65/105; H04W 76/16
See application file for complete search history.

(56) References Cited

U.S. PATENT DOCUMENTS

| | | | |
|---|---|---|---|
| 2016/0029228 A1* | 1/2016 | Mufti .................... | H04W 76/19 370/225 |
| 2016/0066220 A1* | 3/2016 | Bae .................. | H04W 36/0022 370/332 |

(Continued)

FOREIGN PATENT DOCUMENTS

EP        2163068 B1      3/2016

OTHER PUBLICATIONS

3GPP TS 23.221 v15.0.0; Technical Specification; 3rd Generation Partnership Project; Technical Specification Group Services and System Aspects; Architectural requirements (Release 15)—Sep. 2017.
(Continued)

*Primary Examiner* — Nam T Tran
(74) *Attorney, Agent, or Firm* — Baker Botts, LLP

(57) ABSTRACT

A method for enabling a calling User Equipment, UE, to retry a Session Initiation Protocol, SIP, call attempt to a called UE, over a Circuit Switched domain, in a telecommunication network, wherein said called UE has a SIP session established towards said telecommunication network, wherein said method comprises the steps of receiving, by a Proxy Call Session Control Function, P-CSCF, node, an indication that a signalling bearer between said called UE
(Continued)

and said telecommunication network is released, wherein said signalling bearer is associated with said SIP session, transmitting, by said P-CSCF node, to a Serving Call Session Control Function, S-CSCF, node triggered by said received indication, a subscribe message for informing said S-CSCF node that said P-CSCF unsubscribes to registration events pertaining to said called UE due to the released signalling bearer such that said S-CSCF node is able to initiate a CS retry when said telecommunication network receives a SIP call attempt from said calling UE to said called UE.

12 Claims, 3 Drawing Sheets

(52) U.S. Cl.
CPC ...... *H04L 65/1104* (2022.05); *H04L 65/1016* (2013.01); *H04W 76/16* (2018.02)

(56) References Cited

U.S. PATENT DOCUMENTS

| 2017/0171904 A1* | 6/2017 | Wu | H04W 76/18 |
| 2018/0035335 A1* | 2/2018 | Wallis | H04L 65/1073 |
| 2018/0063754 A1* | 3/2018 | Wang | H04W 36/0079 |
| 2019/0124124 A1* | 4/2019 | Chong | H04L 65/1073 |
| 2019/0373515 A1* | 12/2019 | Balasubramanian | H04L 65/1073 |

OTHER PUBLICATIONS

3GPP TS 24.229 v15.4.0; Technical Specification; 3rd Generation Partnership Project; Technical Specification Group Core Network and Terminals; IP multimedia call control protocol based on Session Initiation Protocol (SIP) and Session Description Protocol (SDP); Stage 3 (Release 15)—Sep. 2018.

3GPP TS 24.237 v15.3.0; Technical Specification; 3rd Generation Partnership Project; Technical Specification Group Core Network and Terminals; IP Multimedia (IM) Core Network (CN) subsystem IP Multimedia Subsystem (IMS) Service Continuity; Stage 3 (Release 15)—Jun. 2018.

PCT International Search Report issued for International application No. PCT/EP2018/081074—dated Apr. 2, 2019.

SIP—Specific Event Notification, Category: Standards Track; ISSN: 2070-1721 by A.B. Roach, Tekelec—Jul. 2012.

PCT Written Opinion of the International Searching Authority issued for International application No. PCT/EP2018/081074—dated Apr. 2, 2019.

Intellectual Property Office India, Examination Report in Application No. 202117010905 dated Feb. 2, 2022.

* cited by examiner

METHOD FOR ENABLING A CALLING USER EQUIPMENT, UE, TO RETRY A SESSION INITIATION PROTOCOL, SIP, CALL ATTEMPT TO A CALLED UE, OVER A CIRCUIT SWITCHED DOMAIN

PRIORITY

This nonprovisional application is a U.S. National Stage Filing under 35 U.S.C. § 371 of International Patent Application Serial No. PCT/EP2018/081074 filed Nov. 13, 2018 and entitled "A METHOD FOR ENABLING A CALLING USER EQUIPMENT, UE, TO RETRY A SESSION INITIATION PROTOCOL, SIP, CALL ATTEMPT TO A CALLED UE, OVER A CIRCUIT SWITCHED DOMAIN" which claims priority to European Patent Application No. 18382677.5 filed Sep. 20, 2018 both of which are hereby incorporated by reference in their entirety.

FIELD OF THE INVENTION

The present disclosure generally relates to a method that enables Circuit Switched fallback and, more specifically, to a method that enables Circuit Switched fallback when a particular User Equipment, UE, can not be reached using SIP signalling.

BACKGROUND

Circuit Switched Fallback, with the help of a global system for mobile communication, GSM, or another circuit-switched telecommunication network, may deliver voice and Short Message Service, SMS, to Long Term Evolution, LTE, devices. The necessity for a Circuit Switch FallBack is that the packet-based Internet Protocol, IP, telecommunication network, LTE, cannot support circuit-switched calls. For instance, when an LTE telecommunication network is not available to make or receive either a call or SMS message, the corresponding User Equipment, UE, "falls back" to a more accessible 3G or even 2G telecommunication network to finish the call or to send the SMS message. CSFB is often viewed as a temporary solution.

A Circuit Switched Fallback procedure is currently available when a terminating call is attempted and the called User Equipment, UE, has recently lost 4G, LTE, coverage. Such a procedure is seen in many telecommunication networks around the globe, and is explained in more detail here below.

Initially, a calling UE as well as a called UE are both registered in an Internet Protocol, IP, Multimedia Subsystem, IMS, telecommunication network. Both User Equipment have adequate coverage. At a certain point in time, it may happen that the called UE suddenly loses coverage.

A Policy and Charging Rules Function, PCRF, associated with the called UE may detect that the signalling bearer corresponding to the called UE has been released, i.e. the called UE is no longer reachable., and the PCRF may send an abort session request message to the P-CSCF indicating that the signalling bearer has been released.

At this stage, the Proxy For Call Session Control Function, P-CSCF, may keep the registration of the called UE stored, but with a flag indicating that the called UE is not reachable.

A new call towards the called UE may then be received, by the P-CSCF, originating from the calling UE. The P-CSCF then checks the flag indicating the called UE is not reachable and it then returns an error code back to the telecommunication network. This is described in more detail in 3GPP TS 24.229, chapter 5.2.6.4.3. Upon receipt of such an error code, an application server may perform a retry over the circuit switched domain. That is, the call is attempts over the circuit switched domain, i.e. 2G or 3G access, in case the called UE is actually located there.

One of the drawbacks of the above described solution is that the process of falling back to a circuit switched domain is not performed adequately.

SUMMARY

It is an object of the present disclosure to provide for methods enabling a calling User Equipment, UE, to fallback from a Session Initiation Protocol, SIP, call attempt to a called UE, to a Circuit Switched domain.

It is another object of the present disclosure to provide for nodes that support enabling a calling User Equipment, UE, to fallback from a Session Initiation Protocol, SIP, call attempt to a called UE, to a Circuit Switched domain.

In a first aspect, there is provided a method for enabling a calling User Equipment, UE, to fallback from a Session Initiation Protocol, SIP, call attempt to a called UE, to a Circuit Switched domain, in a telecommunication network, wherein said called UE has a SIP session established towards said telecommunication network.

The method comprises the steps of:
receiving, by a Proxy Call Session Control Function, P-CSCF, node, an indication that a signalling bearer between said called UE and said telecommunication network is released, wherein said signalling bearer is associated with said SIP session;
transmitting, by said P-CSCF node, to a Serving Call Session Control Function, S-CSCF, node, triggered by said received indication, a subscribe message for informing said S-CSCF node that said P-CSCF unsubscribes to registration events pertaining to said called UE due to the released signalling bearer such that said S-CSCF node is able to initiate a CS fallback when said telecommunication network receives a SIP call attempt from said calling UE to said called UE.

It was one of the insights of the inventors that the P-CSCF node should act pro-actively upon receiving the indication that the signalling bearer between the called UE and the telecommunication network is released. The P-CSCF is then aware of the fact that the called UE is no longer reachable for Internet Protocol Multimedia Subsystem, IMS, services. As a result, the P-CSCF now informs the IMS network about the loss of the signalling bearer, i.e. the loss of coverage of the called UE, by transmitting the subscribe message to the S-CSCF node.

The above accomplishes that the IMS network is aware of the fact that the called UE has lost coverage such that a subsequent SIP call attempt towards the called UE may be stopped sooner in the telecommunication network. Any subsequent SIP call attempt, for example a SIP invite message, towards the called UE does not need to traverse the whole telecommunication network before it is stopped by the P-CSCF. In the new situation, such a subsequent SIP call attempt may be stopped beforehand, by any other node in the telecommunication network, thereby improving latency aspects of the CS fallback procedure.

It is noted that the present disclosure deals with SIP calls in an IMS network. The IMS network is considered a concept for an integrated network of telecommunications carriers that facilitate the use of Internet Protocol for packet communications in all known forms over wireless or landline. Examples of such communications include traditional telephony, fax, e-mail, Internet access, Web services, Voice over IP, VoIP, instant messaging, IM, videoconference sessions and video on demand, VoD. The IMS network uses a packet switched topology.

The circuit switched domain of the present disclosure may be directed to Circuit switching for voice communication in 3G.

In an example, the method further comprises the steps of:
receiving, by said P-CSCF node, from said S-CSCF node, a notification that said called UE is de-registered in said telecommunication network;
removing, by said P-CSCF node, any registration data pertaining to said called UE.

The P-CSCF may, for example, comprises a local database in which the registration data for the UE's that are registered in the IMS network are stored. Based on the received notification that the called UE is de-registered, the registration data pertaining to the called UE may be removed from the local database.

In a further example, the step of receiving said indication that said signalling bearer between said called UE and said telecommunication network is released comprises:
receiving, by said P-CSCF node, from a Policy and Charging Rules Function, PCRF, node, an abort session request, ASR, message indicating that said signalling bearer is released.

The abort session request may, for example, comprise an abort reason, for example indicating that the signalling bearer is no longer active. In other words, the signalling bearer of the called UE is released.

In a second aspect, there is provided a method for enabling a calling User Equipment, UE, to fallback from a Session Initiation Protocol, SIP, call attempt to a called UE, to a Circuit Switched domain, in a telecommunication network, wherein said called UE has a SIP registration established towards said telecommunication network.

The method comprises the steps of:
receiving, by a Serving Call Session Control Function, S-CSCF, from a Proxy Call Session Control Function, P-CSCF, node, a subscribe message for informing said S-CSCF node that said P-CSCF unsubscribes to registration events pertaining to said called UE due to a released signalling bearer between said called UE and said telecommunication network, wherein said signalling bearer is associated with said SIP registration;
acknowledging, by said S-CSCF, said subscribe message to said P-CSCF node.

The S-CSCF node may treat the received subscribe message as a network initiated IMS de-registration for the called UE. Hence, it may end the subscription of the called UE by notifying the P-CSCF node about the subscription termination, using an existing reason like "noresource" in the notification.

In a further example, the method further comprises the step of:
notifying, by S-CSCF, said P-CSCF, subscription termination for said called UE.

In another example, the method further comprises the step of:
transmitting, by said S-CSCF, to an application server comprised by said telecommunication network, a register message for informing said application server that said called UE is not registered in said telecommunication network.

The advantage of notifying the application server is that the application server is typically one of the earliest entry points in the telecommunication network when a new SIP call is being set up. As such, the new SIP call may end quickly within the telecommunication network by informing the calling UE that the called UE is no longer available within the IMS domain.

In a third aspect, there is provided a Proxy Call Session Control Function, P-CSCF, arranged for enabling a calling User Equipment, UE, to fallback from a Session Initiation Protocol, SIP, call attempt to a called UE, to a Circuit Switched domain, in a telecommunication network, wherein said called UE has a SIP session established towards said telecommunication network, wherein said P-CSCF comprises:
receive equipment arranged for receiving an indication that a signalling bearer between said called UE and said telecommunication network is released, wherein said signalling bearer is associated with said SIP session;
transmit equipment arranged for transmitting to a Serving Call Session Control Function, S-CSCF, node, triggered by said received indication, a subscribe message for informing said S-CSCF node that said P-CSCF unsubscribes to registration events pertaining to said called UE due to the released signalling bearer such that the network is able to initiate a CS fallback when said telecommunication network receives a SIP call attempt from said calling UE to said called UE.

The advantages of the first, and second, aspect of the disclosure are also inherently part of the other aspects of the present disclosure. Furthermore, it is pointed out that although the claims read as if all the modules/equipment according to this third and the fourth aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipment as such.

In an example, said receive equipment is further arranged for receiving, from said S-CSCF node, a notification that said called UE is de-registered in said telecommunication network,
And wherein said P-CSCF node further comprises
process equipment arranged for removing any registration data pertaining to said called UE.

In another example, the receive equipment is further arranged for receiving, from a Policy and Charging Rules Function, PCRF, node, an abort session request, ASR, message indicating that said signalling bearer is released.

In a fourth aspect, there is provided a Serving Call Session Control Function, S-CSCF, arranged for enabling a calling User Equipment, UE, to retry a Session Initiation Protocol, SIP, call attempt to a called UE, over a Circuit Switched domain, in a telecommunication network, wherein said called UE has a SIP session established towards said telecommunication network, wherein said S-CSCF comprises:
receive equipment arranged for receiving, from a Proxy Call Session Control Function, P-CSCF, node, a subscribe message for informing said S-CSCF node that said P-CSCF unsubscribes to registration events pertaining to said called UE due to a released signalling bearer between said called UE and said telecommunication network, wherein said signalling bearer is associated with said SIP session;
transmit equipment arranged for acknowledging said subscribe message to said P-CSCF node.

In an example, the process equipment is further arranged for notifying said P-CSCF, subscription termination for said called UE.

In a further example, the transmit equipment is arranged for transmitting, to an application server comprised by said telecommunication network, a register message for informing said application server that said called UE is not registered in said telecommunication network.

In a fifth aspect, there is provided a computer program product comprising computer readable medium having instructions stored thereon which, when loaded on a network node accomplish that said network node performs a method in accordance with any of the method examples as provided above.

In a sixth aspect, there is provided a Proxy Call Session Control Function, P-CSCF, for enabling a calling User Equipment, UE, to retry a Session Initiation Protocol, SIP, call attempt to a called UE, over a Circuit Switched domain, in a telecommunication network, wherein said called UE has a SIP session established towards said telecommunication network, wherein said P-CSCF comprises:

- a receive module for receiving an indication that a signalling bearer between said called UE and said telecommunication network is released, wherein said signalling bearer is associated with said SIP session;
- a transmit module for transmitting to a Serving Call Session Control Function, S-CSCF, node, triggered by said received indication, a subscribe message for informing said S-CSCF node that said P-CSCF unsubscribes to registration events pertaining to said called UE due to the released signalling bearer such that said S-CSCF node is able to initiate a CS retry when said telecommunication network receives a SIP call attempt from said calling UE to said called UE.

In a seventh aspect, there is provided a Serving Call Session Control Function, S-CSCF, for enabling a calling User Equipment, UE, to retry a Session Initiation Protocol, SIP, call attempt to a called UE, over a Circuit Switched domain, in a telecommunication network, wherein said called UE has a SIP session established towards said telecommunication network, wherein said S-CSCF comprises:

- a receive module for receiving, from a Proxy Call Session Control Function, P-CSCF, node, a subscribe message for informing said S-CSCF node that said P-CSCF unsubscribes to registration events pertaining to said called UE due to a released signalling bearer between said called UE and said telecommunication network, wherein said signalling bearer is associated with said SIP session;
- a transmit module for acknowledging said subscribe message to said P-CSCF node.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
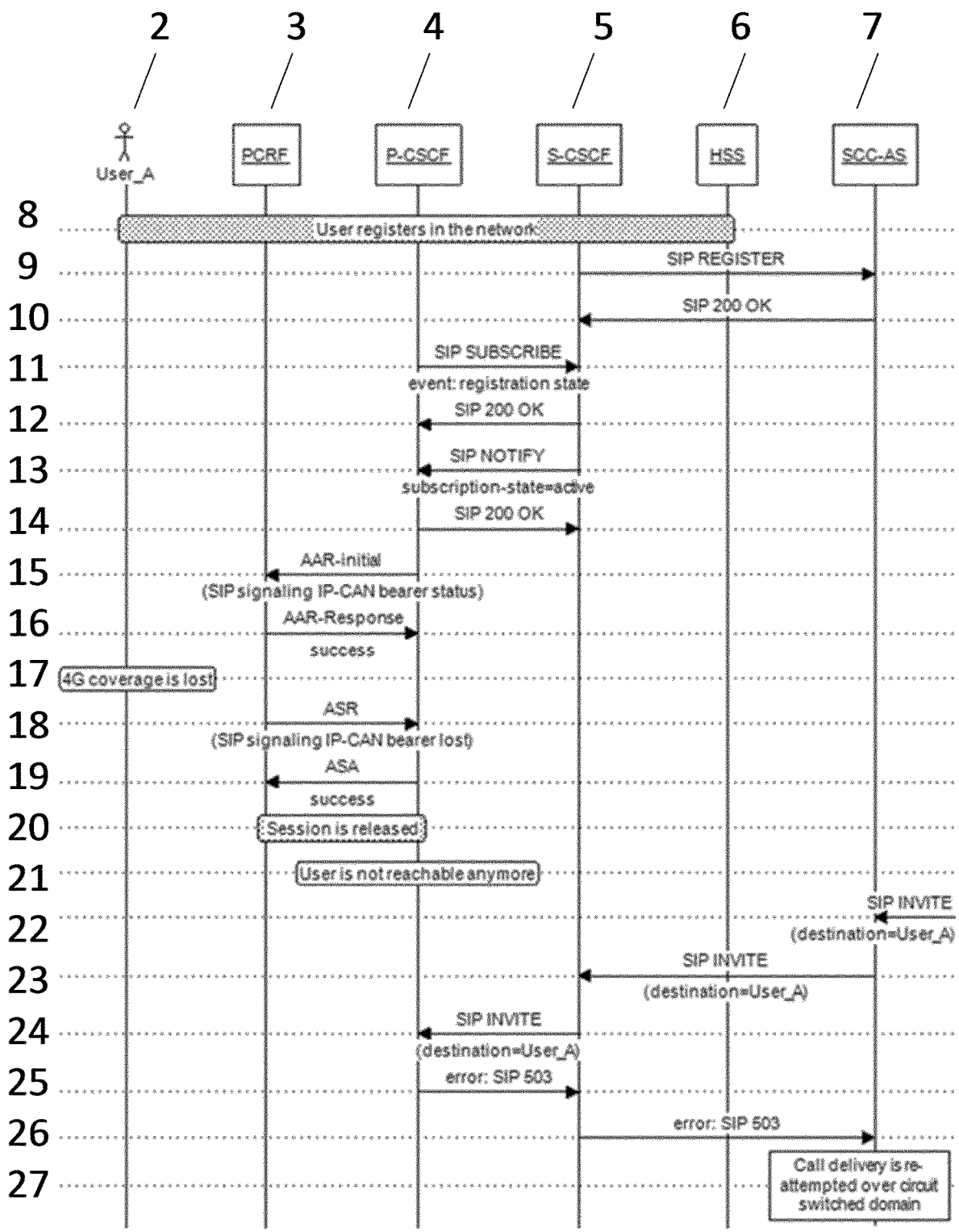
FIG. 1 shows, schematically, a flow chart of an IMS call attempt which is reverted to a circuit switched call in accordance with the prior art.

FIG. 1 shows, schematically, a flow chart of an IMS call attempt which is reverted to a circuit switched call in accordance with the prior art.

Here, a procedure is depicted in which a particular User Equipment, UE, 2 which is referred to as the called UE in this particular disclosure, registers 8 to an Internet Protocol Multimedia Subsystem, IMS, network. For simplicity reasons, the Radio Access Network, RAN, is omitted in the figure.

The IMS network comprises the Policy and Charging Rules Function, PCRF, node 3, the Proxy Call Session Control Function, P-CSCF, node 4, the Subscriber Call Session Control Function, S-CSCF, node 5, the Home Subscriber Server 6 and the Service Centralization and Continuity Application Server, SCC-AS, node 7.

As mentioned above, the User Equipment 2 registers 8 in the network. In this particular example, registration is the process in which the User Equipment 2 sends a SIP REGISTER to the telecommunication network to let the telecommunication network know where it is. The request includes the User Equipment's 2 contact list. It's typically a three step process starting with the User Equipment 2 sending a request. Upon receipt by the telecommunication network, the telecommunication network sends back a challenge and upon receiving back a correct response, i.e. valid user ID and password, the telecommunication network validates the user's credentials and registers the user in it's contact database. The telecommunication network may then sends a 200 OK response which includes the user's current contact list in Contact headers.

Registration may then update on a regular schedule with the User Equipment sending the list of addresses where the SIP server will redirect or forward INVITE requests. Since the User Equipment 2 is already authenticated with the SIP server, the User Equipment 2 supplies authentication credentials with the request and is not challenged by the SIP server.

In any case, once registered, the S-CSCF 5 may notify 9 the SCC-AS, using a SIP REGISTER message, with respect to the IMS registration status and the capabilities of the User Equipment 2, which are included by the User Equipment 2 during the registration process 2. The SCC-AS 7 may acknowledge 10 the SIP REGISTER message using a SIP 200 OK message, which is forwarded (not shown), by the S-CSCF 5 to the P-CSCF 4.

In step 11, the P-CSCF 4 subscribes to the registration status of the User Equipment 2 so that any registration even, for example manual de-registration by the operator which results in a network initiated de-registration, is notified by the S-CSCF 5 to the P-CSCF 4. In step 12, the corresponding SIP SUBSCRIBE message of step 11 is acknowledged in a SIP 200 OK.

In step 13, the S-CSCF 5 notifies the P-CSCF 4 about the successful subscription that is created, so that from that moment on, the P-CSCF 4 may receive subsequent notification for any registration events pertaining to the UE 2, which is, subsequently, acknowledged in step 14 using a SIP 200 OK message.

It is noted that the P-CSCF is typically subscribed to changes in the signalling bearer associated with the session of the UE 2 with the telecommunication network. This is, for example, described in 3GPP TS 29.214. This corresponding process is shown in step 15 and step 16.

In the context of the present disclosure, the signalling bearer is a radio bearer used for call control signalling, i.e. SIP protocol, e.g. to initiate and receive Voice over Long Term Evolution, LTE, calls. The P-CSCF 4 subscribes to this bearer since when the bearer is released, for example due to loss of coverage, the UE 2 is assumed to be unreachable for the telecommunication network.

At a certain point in time the UE 2 may lose radio coverage, for example 4G/LTE coverage, which is indicated with reference numeral 17. In step 18, the PCRF 3 notifies the P-CSCF 4 about the loss of coverage of the UE 2 using an abort session request, ASR, message. In other words, the message indicates that the signalling bearer of associated with the UE 2 has been release such that the UE 2 is no longer reachable. Steps 19 and 20 relate to an acknowledgement message and to a session being released for that UE 2.

At this stage, which is indicated with reference numeral 21, the P-CSCF 4 keeps the UE 2 registration data stored, but with a flag indicating that the UE 2 is unreachable.

Reference numerals 22, 23 and 24 indicate that a new SIP call is received from a calling UE (not shown) to the called UE 2. As the SCC-AS 7 was informed about the UE 2 registration, it performs a terminating access domain selection based on the IMS registration status, as described in 3GPP TS 23.221, chapter 7.2b. The SIP call is then delivered over LTE access.

Reference numerals 25, 26 and 27 are related to an error message as the user is not reachable anymore. First, using reference numeral 25, the P-CSCF 4 checks the UE unreachable flag, and since it is set, it return an error code, for example an SIP 503 or an SIP 500 error code, as described in 3GPP TS 24.229, chapter 5.2.6.4.3.

Upon reception of the error code, the SCC-AS 7 may perform a Circuit Switched retry. That is, the SIP call is attempted, retried, over a circuit switched domain, for example 2G/3G access, in case the UE 2 is also located there.

Figure 2:
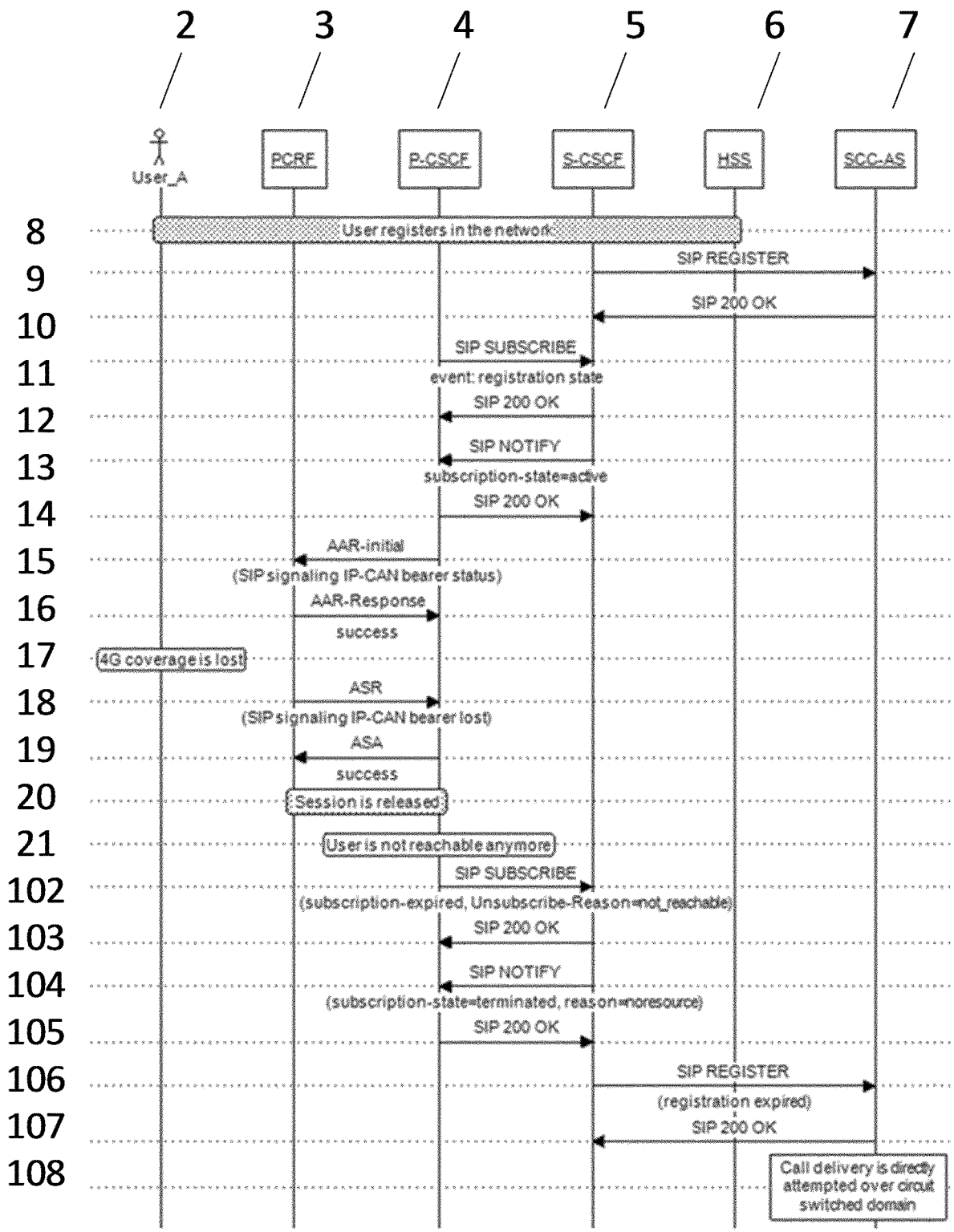
FIG. 2 shows, schematically, a flow chart of an IMS call attempt which is reverted to a circuit switched call in accordance with the present disclosure.

FIG. 2 shows, schematically, a flow chart 101 of an IMS call attempt which is reverted to a circuit switched call in accordance with the present disclosure.

It is noted that the same reference numerals are used as with respect to the reference numerals shown in FIG. 1 for the same entities, or the same functionality, respectively.

The inventors have found that the circuit switched fallback as disclosed in FIG. 1 is disadvantageous for several reasons. First, registration data pertaining to the UE 2 may be kept, i.e. stored, by several nodes in the telecommunication network while in fact that is not necessary anymore as the UE 2 has lost coverage.

Another disadvantage is related to the latency of the initiated call towards the called UE 2 in case a circuit switched fallback is to be used. The initial SIP call need to traverse the telecommunication network up to the P-CSCF 4 before an error message is generated, and thus before a circuit switched retry is initiated.

A further disadvantage is the number of error SIP 500/503 messages which are collected, and make it hard to distinguish which are network errors and which are related to more conventional scenarios like UE's moving from 4G to 3G without calls being lost.

The present disclosure is directed to provide means for the P-CSCF to include additional information about the reason to unsubscribe to a particular event, for example a loss of coverage. The additional information may be used by the S-CSCF to take decisions about the resource subscribed/notified which is, in the present case, a registration event.

This may be done as follows. When unsubscribing, and based on the configuration of the P-CSCF 4, include a new unsubscribe reason SIP header SIP SUBSCRIBE method with a new value such as "not_reachable" when the P-CSCF 4 has the knowledge about the non-reachability of the UE 2.

When notifying the P-CSCF 4 about the subscription state for the UE 2 being terminated, and based on the S-CSCF 5 configuration, consider the resource as invalid, i.e. remove the IMS registration data of the UE 2, and act accordingly.

The above is described in detail with respect to FIG. 2. In FIG. 2, the steps as indicated with reference numerals 8-21 are the same as the steps as indicated with reference numerals 8-21 of FIG. 1.

As such, the P-CSCF node 4 has received an indication that a signalling bearer between said called UE 2 and said telecommunication network is released, wherein said signalling bearer is associated with said SIP session.

In reaction thereto, the P-CSCF node 4 transmits 102, to the S-CSCF node 5, a subscribe message for informing said S-CSCF node 5 that said P-CSCF 4 unsubscribes to registration events pertaining to said called UE due to the released signalling bearer such that said S-CSCF node 5 is able to initiate a CS retry when said telecommunication network receives a SIP call attempt from said calling UE to said called UE 2. The subscribe message is acknowledged in step 103.

The steps as indicated with reference numerals 103, 104 and 105 may be summarized as follows. Upon receiving the above described new indication, which means that the UE registration data is not valid anymore, the S-CSCF 5, based on configuration choice, may treat the indication as a network initiated IMS deregistration. Hence, it ends the subscription by notifying the P-CSCF 4 about the subscription termination, using, for example, existing reason "noresource" in the notification, i.e. the resource being the UE 2 no longer exists.

At this stage, when the P-CSCF 4 receives the subscription state and the reason, it may remove the registration data from its local database.

The steps as indicated with reference numerals 106, 107 and 108 may be summarized as follows. The S-CSCF 5 may inform the SCC-AS 7 about the UE 2 not being registered in the telecommunication network, which is also acknowledged by the SCC-AS 7. Any call towards the UE 2 may then result in an immediate CS fallback, since the SCC-AS 7 is aware that the UE 2 is not reachable in LTE, i.e. the UE 2 is not registered anymore in the telecommunication network.

Figure 3:
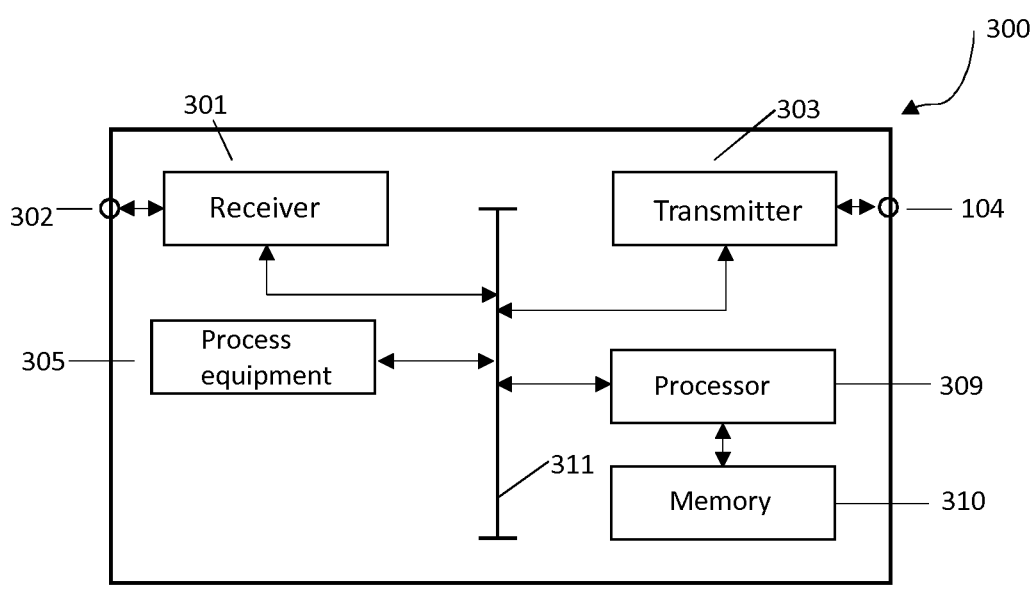
FIG. 3 shows, schematically, a P-CSCF node in accordance with the present disclosure.

FIG. 3 shows, schematically, a P-CSCF node 200 in accordance with the present disclosure.

The Proxy Call Session Control Function, P-CSCF, 200 is arranged for enabling a calling User Equipment, UE, to retry a Session Initiation Protocol, SIP, call attempt to a called UE, over a Circuit Switched domain, in a telecommunication network, wherein said called UE has a SIP session established towards said telecommunication network.

The P-CSCF 200 comprises:
receive equipment 201 arranged for receiving, via a receiving terminal 202, an indication that a signalling bearer between said called UE and said telecommunication network is released, wherein said signalling bearer is associated with said SIP session;
transmit equipment 203 arranged for transmitting, via a transmitting terminal 204, to a Serving Call Session Control Function, S-CSCF, node, triggered by said received indication, a subscribe message for informing said S-CSCF node that said P-CSCF unsubscribes to registration events pertaining to said called UE due to the released signalling bearer such that said S-CSCF node is able to initiate a CS retry when said telecommunication network receives a SIP call attempt from said calling UE to said called UE.

The P-CSCF 200 may further comprise process equipment 205 arranged for removing any registration data pertaining to said called UE. Finally, the P-CSCF 200 comprises a processor 209 in communication with a memory 210, wherein the processor is arranged to communicate with the receiving equipment 201, the transmit equipment 203 and the process equipment 205 via a bus 211.

Figure 4:
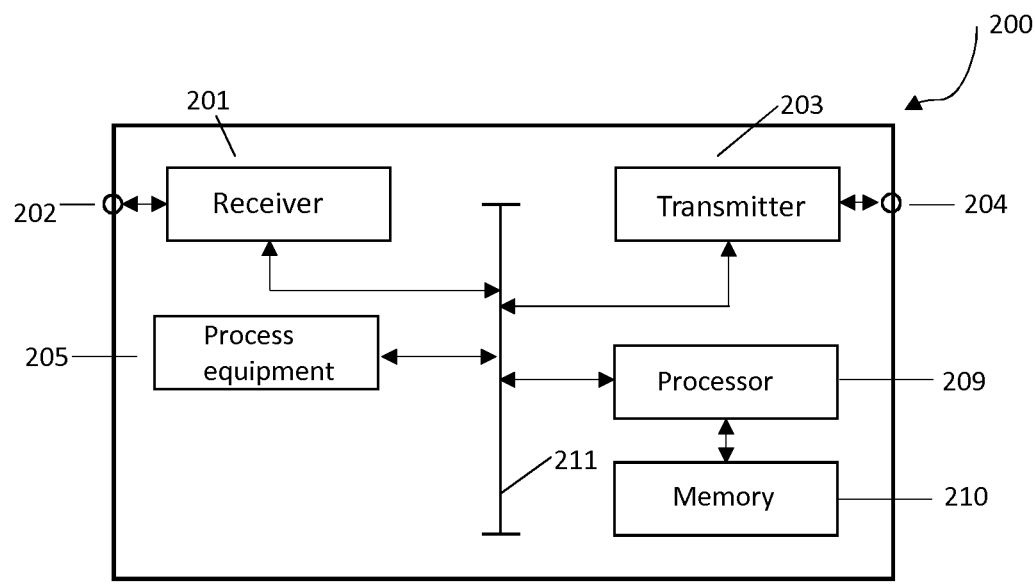
FIG. 4 shows, schematically, a S-CSCF node in accordance with the present disclosure.

FIG. 4 shows, schematically, a S-CSCF node 300 in accordance with the present disclosure.

The Serving Call Session Control Function, S-CSCF, 300 is arranged for enabling a calling User Equipment, UE, to retry a Session Initiation Protocol, SIP, call attempt to a called UE, over a Circuit Switched domain, in a telecommunication network, wherein said called UE has a SIP session established towards said telecommunication network. The S-CSCF comprises:

receive equipment 301 arranged for receiving, via a receiving terminal 302, from a Proxy Call Session Control Function, P-CSCF, node, a subscribe message for informing said S-CSCF node that said P-CSCF unsubscribes to registration events pertaining to said called UE due to a released signalling bearer between said called UE and said telecommunication network, wherein said signalling bearer is associated with said SIP session;

transmit equipment 303 arranged for acknowledging, via a transmit terminal 304, said subscribe message to said P-CSCF node.

The S-CSCF 300 may further comprise process equipment 305 arranged for notifying said P-CSCF, subscription termination for said called UE. Finally, the S-CSCF 300 comprises a processor 309 in communication with a memory 310, wherein the processor 309 is arranged to communicate with the receiving equipment 301, the transmit equipment 303 and the process equipment 305 via a bus 311.

One of the advantages of the present disclosure is that the latency involved in the fallback procedure to a switched circuit domain has been reduced, as the initial call from the calling UE to the called UE does no longer need to traverse the telecommunication network. An error message, relating to the fact that the called UE is no longer reachable, may, for example, be sent by the SCC-AS.

Another advantage is that the network load is reduced as less messages are to be transmitted from nodes to each other. The network load of the telecommunication network is thus reduced.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method for enabling a calling User Equipment, UE, to fallback from a Session Initiation Protocol, SIP, call attempt to a called UE, to a Circuit Switched domain, in a telecommunication network, wherein said called UE has a SIP session established towards said telecommunication network, wherein said method comprises the steps of:

receiving, by a Proxy Call Session Control Function, P-CSCF, node, an indication that a signalling bearer between said called UE and said telecommunication network is released, wherein said signalling bearer is associated with said SIP session;

transmitting, by said P-CSCF node, to a Serving Call Session Control Function, S-CSCF, node, triggered by said received indication, a subscribe message for informing said S-CSCF node that said P-CSCF unsubscribes to registration events pertaining to said called UE due to the released signalling bearer such that said telecommunication network is able to initiate a CS fallback when said telecommunication network receives a SIP call attempt from said calling UE to said called UE.

2. A method in accordance with claim 1, wherein said method further comprises the steps of:

receiving, by said P-CSCF node, from said S-CSCF node, a notification that said called UE is de-registered in said telecommunication network;

removing, by said P-CSCF node, any registration data pertaining to said called UE.

3. A method in accordance with claim 1, wherein said step of receiving said indication that said signalling bearer between said called UE and said telecommunication network is released comprises:

receiving, by said P-CSCF node, from a Policy and Charging Rules Function, PCRF, node, an abort session request, ASR, message indicating that said signalling bearer is released.

4. A method for enabling a calling User Equipment, UE, to retry a Session Initiation Protocol, SIP, call attempt to a called UE, over a Circuit Switched domain, in a telecommunication network, wherein said called UE has a SIP session established towards said telecommunication network, wherein said method comprises the steps of:

receiving, by a Serving Call Session Control Function, S-CSCF, from a Proxy Call Session Control Function, P-CSCF, node, a subscribe message for informing said S-CSCF node that said P-CSCF unsubscribes to registration events pertaining to said called UE due to a released signalling bearer between said called UE and said telecommunication network, wherein said signalling bearer is associated with said SIP session;

acknowledging, by said S-CSCF, said subscribe message to said P-CSCF node.

5. A method in accordance with claim 4, wherein said method further comprises the step of:

notifying, by said S-CSCF, said P-CSCF, subscription termination for said called UE.

6. A method in accordance with claim 4, wherein said method further comprises the step of:
   transmitting, by said S-CSCF, to an application server comprised by said telecommunication network, a register message for informing said application server that said called UE is not registered in said telecommunication network.

7. A Proxy Call Session Control Function, P-CSCF, arranged for enabling a calling User Equipment, UE, to retry a Session Initiation Protocol, SIP, call attempt to a called UE, over a Circuit Switched domain, in a telecommunication network, wherein said called UE has a SIP session established towards said telecommunication network, wherein said P-CSCF comprises:
   receive equipment arranged for receiving an indication that a signalling bearer between said called UE and said telecommunication network is released, wherein said signalling bearer is associated with said SIP session;
   transmit equipment arranged for transmitting to a Serving Call Session Control Function, S-CSCF, node, triggered by said received indication, a subscribe message for informing said S-CSCF node that said P-CSCF unsubscribes to registration events pertaining to said called UE due to the released signalling bearer such that said telecommunication network is able to initiate a CS fallback when said telecommunication network receives a SIP call attempt from said calling UE to said called UE.

8. A P-CSCF in accordance with claim 7, wherein said receive equipment is further arranged for receiving, from said S-CSCF node, a notification that said called UE is de-registered in said telecommunication network,
   And wherein said P-CSCF node further comprises
   process equipment arranged for removing any registration data pertaining to said called UE.

9. A P-CSCF in accordance with claim 7, wherein said receive equipment is further arranged for receiving, from a Policy and Charging Rules Function, PCRF, node, an abort session request, ASR, message indicating that said signalling bearer is released.

10. A Serving Call Session Control Function, S-CSCF, arranged for enabling a calling User Equipment, UE, to retry a Session Initiation Protocol, SIP, call attempt to a called UE, over a Circuit Switched domain, in a telecommunication network, wherein said called UE has a SIP session established towards said telecommunication network, wherein said S-CSCF comprises:
   receive equipment arranged for receiving, from a Proxy Call Session Control Function, P-CSCF, node, a subscribe message for informing said S-CSCF node that said P-CSCF unsubscribes to registration events pertaining to said called UE due to a released signalling bearer between said called UE and said telecommunication network, wherein said signalling bearer is associated with said SIP session;
   transmit equipment arranged for acknowledging said subscribe message to said P-CSCF node.

11. A S-CSCF in accordance with claim 10, wherein said S-CSCF further comprises process equipment arranged for notifying said P-CSCF, subscription termination for said called UE.

12. A S-CSCF in accordance with claim 10, wherein said transmit equipment is arranged for transmitting, to an application server comprised by said telecommunication network, a register message for informing said application server that said called UE is not registered in said telecommunication network.

\* \* \* \* \*